(12) United States Patent
Martin et al.

(10) Patent No.: US 6,386,307 B1
(45) Date of Patent: May 14, 2002

(54) TRANSMISSION APPARATUS FOR A VEHICLE HAVING AT LEAST TWO DRIVABLE DISPLACEMENT MEMBERS IN LINE

(75) Inventors: Louis Martin, Compiegne; Jean-Claude Cousin, Pontpoint, both of (FR)

(73) Assignee: Poclain Hydraulics Industrie, Verberie (FR)

( * ) Notice: Subject to any disclaimer, the term of this patent is extended or adjusted under 35 U.S.C. 154(b) by 0 days.

(21) Appl. No.: 09/496,426

(22) Filed: Feb. 2, 2000

(30) Foreign Application Priority Data

Feb. 5, 1999 (FR) .............................. 99 01361

(51) Int. Cl.[7] ........................................... B60K 17/356
(52) U.S. Cl. ...................................................... 180/242
(58) Field of Search ................................. 180/242, 308, 180/307, 305; 417/491

(56) References Cited

U.S. PATENT DOCUMENTS 5,328,321 A 7/1994 Moffett et al.

6,099,273 A * 8/2000 Allart et al. ................. 417/491

FOREIGN PATENT DOCUMENTS

| EP | 0176427 | 4/1986 |
|----|---------|--------|
| EP | 0547947 | 6/1993 |
| EP | 0816153 | 1/1998 |
| FR | 2719001 | 10/1995 |

* cited by examiner

*Primary Examiner*—Anne Marie Boehler
(74) *Attorney, Agent, or Firm*—Ladas & Parry

(57) ABSTRACT

The apparatus comprises two hydraulic motors to which two displacement members in line are respectively coupled. Each of the motors has three main connections, namely one main connection that is common to both of its cylinder capacities, and two main connections, one for each of its two cylinder capacities. The first main connection of the first motor is connected to the fluid feed and the first main connection of the second motor is connected to the fluid return. The two main connections of the motors are interconnected. A selector having at least two positions is connected to the fluid feed, to the fluid return, and to the third main connection of at least one of the motors. For each of the two selector positions, the total cylinder capacity fed by the pump differs.

24 Claims, 3 Drawing Sheets

TRANSMISSION APPARATUS FOR A VEHICLE HAVING AT LEAST TWO DRIVABLE DISPLACEMENT MEMBERS IN LINE

The present invention relates to transmission apparatus for two vehicle displacement members disposed one behind the other in the direction of displacement of the vehicle, the apparatus including a hydraulic pump and first and second hydraulic motors to which the first and second displacement members are respectively coupled, said hydraulic motors being dual-capacity motors, each of which comprises two elementary motors, each elementary motor having first and second elementary connections, for feed or discharge purposes, the first elementary connections being put in common to form a first main connection of the dual-capacity motor, while the second elementary connections are separate and form respectively second and third main connections of the dual-capacity motor, the first main connection of the first hydraulic motor being connected to a fluid feed duct coming from the pump and the first main connection of the second hydraulic motor being connected to a fluid return duct, the second main connections of the first and second hydraulic motors being interconnected via an interconnection duct.

BACKGROUND OF THE INVENTION

The invention is applicable, for example, to vehicles having a hydraulic transmission with two displacement members disposed in line, one of which is steerable. For example such a vehicle may be a tandem compactor whose displacement members are constituted by rollers.

As explained below, the invention is also applicable to vehicles having two groups, each of two displacement members disposed in line, on either side of the vehicle. For example, such vehicles may be four-wheel-drive farm vehicles such as a combine harvester.

Patent Application EP 0 176 427 discloses three-port dual-capacity motors, and EP 0 547 947 applies them to a vehicle having three or four drivable wheels.

OBJECTS AND SUMMARY OF THE INVENTION

An object of the invention is to improve known apparatus so as to provide the vehicle with at least two speed ranges in translation, while continuing to make provision to synchronize the displacement members driven by the first and second hydraulic motors so as to prevent them from spinning.

This object is achieved by the fact that the apparatus of the invention further includes a selector having two or more positions and connected to said fluid feed duct, to said fluid return duct and to the third main connection of at least one of the first and second hydraulic motors, said selector having a high-torque position in which both hydraulic motors when as considered together with respect to how they are fed with fluid by the pump present a first total cylinder capacity, and a high-speed position in which both hydraulic motors when considered together with respect to how they are fed with fluid by the pump present a second total cylinder capacity smaller than said first total cylinder capacity.

It is known that, when two motors are fed in series, then, with respect to how they are fed with fluid, they present the same cylinder capacity that is equal to the cylinder capacity of one of the two motors. In contrast, when the same motors are fed in parallel, then, with respect to how they are fed with fluid by the pump, they present a large cylinder capacity that is equal to the sum of their respective cylinder capacities. When the cylinder capacity is high, the drive torque delivered by the motors is also high, which makes it possible for the vehicle to travel under difficult conditions, e.g. on a slippery building site. In contrast, when the cylinder capacity is low, the drive torque delivered by the motors is lower, and the vehicle can then move at a fast speed, under conditions different from its high-torque conditions.

Depending on which of its positions it takes up, the selector of the apparatus of the invention makes it possible to place certain elementary motors of the dual-capacity motors in series or in parallel, which, for the reasons indicated above, makes it possible to obtain a plurality of speed ranges.

It is possible to consider making provision for three types of configuration, namely a high-torque configuration, a medium configuration, and a high-speed configuration.

In the high-torque configuration, the third main connection of the first motor is connected to the fluid return duct while the third main connection of the second motor is connected to the fluid feed duct.

In the medium configuration, the third main connection of the first motor is connected to the third main connection of the second motor.

In the high-speed configuration, the third main connection of the first motor is connected to the fluid feed duct, while the third main connection of the second motor is connected to the fluid return duct.

The selector of the apparatus of the invention then has at least two positions corresponding respectively to one of the above-indicated configurations and to another one of said configurations.

In the high-torque configuration and in the high-speed configuration, the second main connections of the first and second hydraulic motors communicate with each other. In other words, the first elementary motors of each of the two hydraulic motors are disposed in series, so that the displacement members are synchronized.

In the high-torque configuration, the second elementary motors are connected in parallel relative to the series circuit of the first elementary motors. Therefore, with respect to how they are fed with fluid by the pump, the two motors have a total cylinder capacity equal to the sum of the cylinder capacity of the first motor fed first by the pump plus the cylinder capacity of the second elementary motor of the second motor, also fed by the pump.

In the medium configuration, the first and second elementary motors of the second hydraulic motor are connected in series respectively to the first elementary motor and to the second elementary motor of the first hydraulic motor. Therefore, the total cylinder capacity offered by the two motors with respect to how they are fed with fluid by the pump is equal to the entire cylinder capacity of the first hydraulic motor, i.e. to the sum of the cylinder capacities of the two elementary motors of the first hydraulic motor.

In the high-speed configuration, the two elementary motors of each of the two hydraulic motors are deactivated because their two connections (first main connection and second elementary connection) are connected to the same duct, i.e. to the fluid feed duct for the first hydraulic motor, and to the fluid return duct for the second hydraulic motor. The total cylinder capacity offered by both of the hydraulic motors with respect to how they are fed with fluid by the pump is equal to the cylinder capacity of the first elementary motor of the first hydraulic motor that is fed first by the pump, the first elementary motor of the second hydraulic motor being disposed in series.

BRIEF DESCRIPTION OF THE DRAWINGS

The invention will be well understood, and its advantages will appear more clearly on reading the following detailed description of embodiments shown by way of non-limiting example. The description refers to the accompanying drawings, in which.

MORE DETAILED DESCRIPTION

Figure 1:
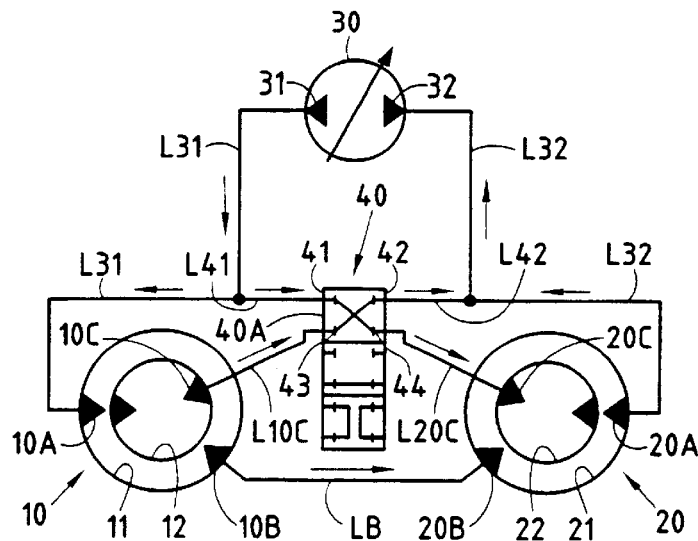
FIG. 1 shows apparatus of the invention, as applied to two displacement members disposed in line on a vehicle, when the selector is in the high-torque position.

The circuit shown in FIG. 1 includes first and second hydraulic motors 10, 20 serving to drive the displacement members disposed in line on a vehicle having hydrostatic transmission. The motors are dual-capacity motors, each of which comprises first and second elementary motors, respectively 11 and 12 for motor 10, and 21 and 22 for motor 20.

For each dual-capacity motor, the first elementary connections of the elementary motors are put in common to form a first main connection, respectively 10A for motor 10, and 20A for motor 20. For each dual-capacity motor, the second elementary connections of the elementary motors are separate and they thus form the second and third main connections of the dual-capacity motor, respectively 10B and 10C for motor 10, and 20B and 20C for motor 20.

The first main connection 10A of the motor 10 is connected to a fluid feed duct L31 coming from the pump 30, while the first main connection 20A of the motor 20 is connected to a fluid return line L32.

Figure 2:
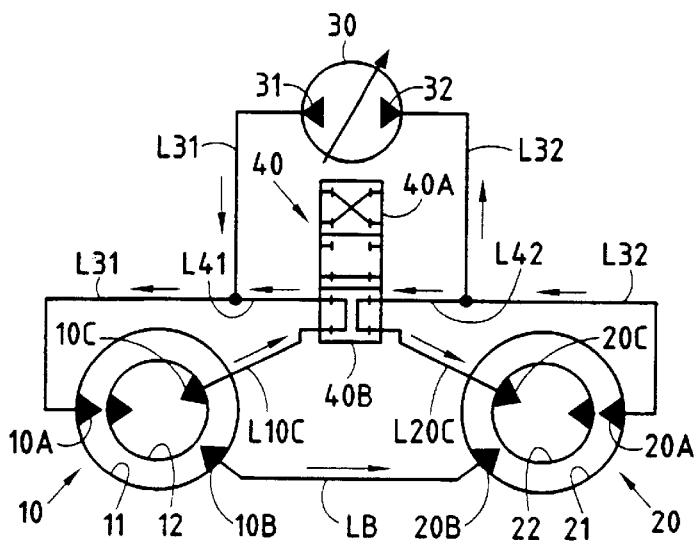
FIGS. 2 and 3 shows the apparatus of FIG. 1, respectively in a high-speed position and in a medium speed position.
Figure 3:
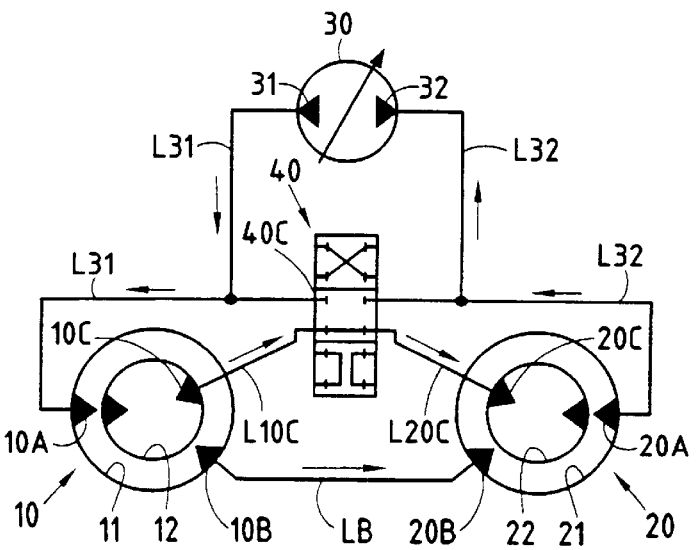

The circuit shown by way of example in FIG. 1 is a closed circuit, the pump 30 being of variable flow rate and having two ports 31 and 32, respectively for fluid delivery and fluid intake. The line L31 is connected to the port 31, while the line L32 is connected to the port 32. It should however be noted that the apparatus may also be applied to open circuits, with a pump having a single port for fluid delivery, in which case the fluid return duct is connected to a tank that is not under pressure. In FIGS. 1 to 3, the direction of flow of the fluid in forward drive is indicated by the arrows.

The second main connections 10B and 20B of the motors 10 and 20 are interconnected via an interconnection line LB. The apparatus includes a selector 40 which, in the example shown, has four ports, respectively 41, 42, 43, and 44. The first port 41 is connected to the fluid feed duct L31 via a secondary link duct L41. The second port 42 is connected to the fluid return duct L32 via a secondary link duct L42. The third port 43 is connected to the third main connection of the motor 10 via a link duct L10C, while the fourth port 44 is connected to the third main connection 20C of the motor 20 via a link duct L20C. Thus, in the example shown in FIGS. 1 to 3, the selector has four ports which make it possible to connect it respectively to the fluid feed duct, to the fluid return duct, to the third main connection of the first hydraulic motor, and to the third main connection of the second hydraulic motor. However, as explained below, it is possible to use a selector having three ports, making it possible to connect it respectively to the fluid feed duct, to the fluid return duct, and to the third main connection of one of the hydraulic motors.

FIG. 1 shows the selector 40 in its high-torque position, in which the third main connection 10C of the motor 10 is connected to the fluid return duct L32, via the link between the ports 42 and 43 of the selector, while the third main connection 20C of the motor 20 is connected to the fluid feed duct L31 via the link between the first and fourth ports 41 and 44 of the selector. Thus, the second elementary motor of the motor 10 is connected directly to each of the two ports of the pump, respectively via the main connection 10A and via the main connection 10C, as is the second elementary motor of the motor 20, respectively via the connections 20C and 20A. In other words, the second elementary motors of the motors 10 and 20 are fed in parallel. In contrast, the fluid flowing via the connection 10B of the motor 10 goes via the connection 20B of the motor 20, so that the first elementary motors are disposed in series. Thus, via the duct L31, the pump simultaneously feeds the two elementary motors of the motor 10, and the second elementary motor of the motor 20. The cylinder capacity fed by the pump is thus equal to the sum of the total cylinder capacity of the motor 10 and of the cylinder capacity of the second elementary motor of the motor 20. High torque is thus available, and the vehicle can be used under high-torque conditions. If it is considered that all of the elementary motors have the same cylinder capacity, the flow rate delivered via the port 31 of the pump is shared as follows: two thirds for the motor 10 and the remaining third for the second elementary motor of the motor 20. The high-torque position of the selector 40 is indicated by reference 40A in FIG. 1.

The selector 40 further has at least one second position in which the total cylinder capacity fed by the pump is smaller than the cylinder capacity fed via the line L31 in FIG. 1. For example, FIG. 2 shows the selector in a second position 40B referred to as the "high speed" position. In this position, the third main connection 10C of the motor 10 is connected to the fluid feed line L31 via the link between the ports 41 and 43 of the selector, which link interconnects the ducts L10C and L41. Insofar as the first main connection 10A of the motor 10 is also connected to the fluid feed duct, the second elementary motor of the motor 10 is thus deactivated. Only the first elementary motor remains active, the connections 10A and 10B being subjected to different pressures.

The third main connection 20C of the motor 20 is connected to the fluid return duct L32 via the link between the ports 42 and 44 of the selector, which link interconnects the ducts L20C and L42. The second elementary motor of the motor 20 is thus deactivated, because its two connections 20A and 20C are placed at the same pressure. In contrast, the first elementary motor of the motor 20 is activated by being normally connected in series with the first elementary motor of the motor 10. In which case, the total cylinder capacity fed via the duct L31 is equal to the cylinder capacity of the first elementary motor of the first motor 10 only, which cylinder capacity is equal to the cylinder capacity of the first elementary motor of the motor 20, because these two elementary motors are disposed in series. The cylinder capacity is thus at a minimum, and the vehicle can travel in a high speed range, but it cannot deliver high torque.

In the example shown, the selector further has a third position 40C which is shown in FIG. 3. In this position, the ports 41 and 42 are isolated, while the ports 43 and 44 are interconnected, so that the third main connections 10C and 20C of the motors 10 and 20 are interconnected, while being isolated from the other main connections of the motors. As a result, all of the fluid delivered via the connections 10B and 10C of the motor 10 feeds the ports 20B and 20C of the motor 20, so that the motor 20 is entirely disposed in series with the motor 10. In which case, the total cylinder capacity fed via the port 31 of the pump is equal to the total cylinder capacity of the motor 10, all of the delivered fluid going via the connection 10A.

If it is considered that each elementary motor has a cylinder capacity C, the total cylinder capacities connected to the feed duct L31 in FIGS. 1, 2, and 3 are respectively equal to 3C, to 2C, and to C. Naturally, the displacement members of the vehicle must have the same linear displacement speed. Thus, it is advantageous for both of the hydraulic motors to be of substantially equal cylinder capacity, and to be suitable, at the same speed, for driving displacement members having substantially the same development (i.e. for given throughput of hydraulic fluid through the motors, the distance travelled by the displacement members is the same, the development of one displacement member being the distance travelled for one revolution thereof). It is also possible to use the apparatus of the invention on vehicles whose displacement members have different developments, in which case, the development ratio is taken into account to determine the respective cylinder capacities of each of the motors.

Advantageously, the apparatus includes means for satisfying a bottom pressure limit and a top pressure limit in the interconnection duct LB between the two main connections 10B and 20B of the first and second motors 10 and 20. In a manner known per se, these means may comprise a pressure relief valve and a booster valve connected to a booster pump. Since these elements are known, they are not shown in the circuit of FIGS. 1 to 3, which circuit is shown diagrammatically. In this way, with the same means comprising, for example, a single pressure relief valve and a single booster valve, appropriately placed on the interconnection duct, it is possible to protect the motors 10 and 20 both against pressure surges and against cavitation phenomena.

Other elements that are known, e.g. from Application EP 0 547 947 are not described herein, but they may be used advantageously, such as a progressively-opening distributor placed between the duct LB and one of the ducts L31 or L32, and making it possible, during turning, to have differing speeds on the motors 10 and 20.

Likewise, a vehicle having four or more drivable wheels may advantageously use two circuits as described above, each of the circuits feeding the wheels on a respective side of the vehicle.

In which case, the pumps of the two circuits may be caused to operate simultaneously, in particular when the vehicle is travelling straight ahead on a road. However, the apparatus may include means for managing the control of the cylinder capacities of the pumps, which means are capable of decoupling the control of the two pumps under certain situations, e.g. in a tight turn, or when it is desirable to obtain a pressure in the circuit situated on the outside of the vehicle that is higher than the pressure prevailing in the circuit situated on the inside.

Figure 4:
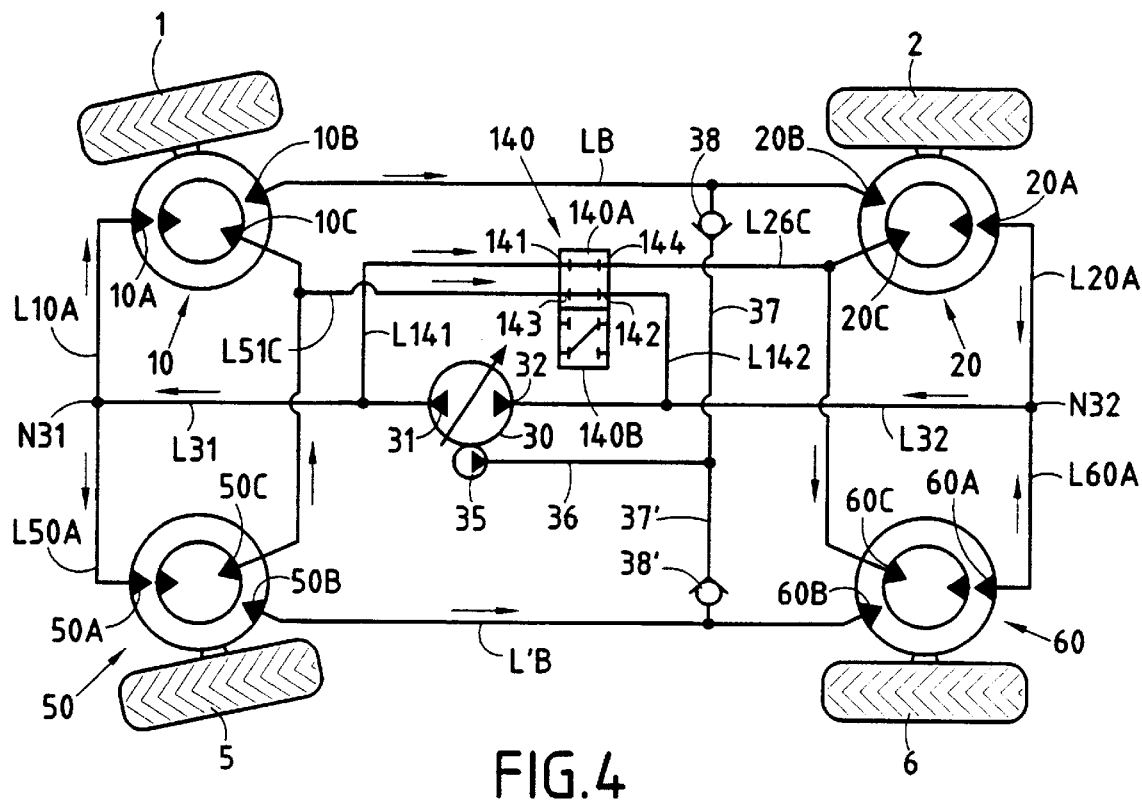
FIG. 4 diagrammatically shows the apparatus of the invention as applied to a vehicle having four drivable wheels disposed in pairs on either side of the vehicle.

The apparatus shown in FIG. 4 is described below as applied to the hydrostatic transmission of a vehicle having four drivable wheels respectively designated by the references 1, 2, 5, and 6. The motors 10 and 20 are analogous to the motors 10 and 20 described above with reference to FIGS. 1 to 3, and it is possible to see their main connections 10A, 10B, 10C and 20A, 20B, 20C, the connections 10A and 20A being connected respectively to the two ports 31 and 32 of the pump via a feed line L31 and a fluid return line L32, while the connections 10B and 20B are interconnected directly by an interconnection line LB.

The apparatus shown in FIG. 4 includes motors 50 and 60 that are analogous to the motors 10 and 20 and that have first, second, and third main connections, respectively 50A, 50B, 50C, and 60A, 60A, 60B, 60C. The connections 50A and 60A are respectively connected to the ports 31 and 32 of the pump 30. More precisely, the feed duct L31 divides, at the node N31, into two branches respectively L10A connected to the connection 10A and L50A connected to the connection 50A. Similarly, the duct L32 comes from a node N32 at which two branches meet, namely a branch L20A connected to the connection 20A, and a branch L60A connected to the connection 60A. The connections 50A and 60B are linked together via an interconnection duct L'B.

The circuit shown in FIG. 4 includes a booster pump 35 that feeds a booster duct 36. The ducts LB and L'B are connected to the duct 36 via branches 37 and 37' which are provided with non-return valves 38 and 38', allowing fluid to flow only in the direction going from the booster pump to the ducts LB and L'B. A minimum pressure is thus maintained in the four motors of the circuit. As indicated above, a top pressure limit in the motors may also be defined by disposing two pressure relief valves (not shown) one on each of the interconnection ducts LB and L'B.

It is also possible to dispose two progressively-opening distributors, one between the duct LB and one of the ducts L31 and L32, and the other between the duct L'B and one of the ducts L31 and L32, so as to make it possible, during turning, to obtain speeds that differ between the motors 10 and 20, and between the motors 50 and 60.

The circuit shown in FIG. 4 includes a selector 140 having two positions, respectively 140A and 140B, and four ports numbered from 141 to 144. The port 141 is connected continuously to the port 31 of the pump, and therefore to the feed duct, via a link duct L141, while the port 142 is connected continuously to the port 32, and thus to the fluid return duct, via a link duct L142. The port 143 is connected to the third main connections 10C and 50C of the motors 10 and 50 via a link duct L51C and its branches, while the port 144 is connected continuously to the third main connections 20C and 60C of the motors 20 and 60 via a link duct L26C and its branches.

In its first position 140A (shown in FIG. 4) corresponding to the high-torque position, the selector 140 puts the connections 20C and 60C in communication with the feed line L31, the ports 141 and 144 being interconnected, so that the second elementary motors of the motors 20 and 60 are fed in parallel with the motors 10 and 50. At the same time, the third elementary connections 10C and 50C are connected to the fluid return line via the link between the ports 142 and 143, so that the second elementary motors of the motors 10 and 50 are active in parallel.

As a result, the pump 30 feeds the total cylinder capacity of the apparatus, which capacity is equal to the sum of the cylinder capacities of the motors 10 and 50 and of the cylinder capacities of the second elementary motors of the motors 20 and 60. If all of the elementary motors have the same cylinder capacity C, the total cylinder capacity fed by the pump is equal to 6C. The first elementary motors of the motors 20 and 60 are fed in series with the first elementary motors of the motors 10 and 50, so that synchronization is obtained between the wheels of the vehicle.

When the selector 140 is in the second position 140B, corresponding to the "high-speed" position, the ports 141 and 142 are isolated, while the ports 143 and 144 are interconnected. As a result, the third elementary connections 10C and 50C of the motors 10 and 50 are connected to the third elementary connections 20C and 60C of the motors 20 and 60, so that the second elementary motors of the motors 20 and 60 are fed in series with the second elementary motors of the motors 10 and 50. A configuration is thus obtained that is analogous to the configuration shown in FIG. 3, in which configuration the motors 20 and 60 are entirely connected in series to the motors 10 and 50. The total cylinder capacity of the apparatus, as fed by the pump, is thus equal only to the sum of the cylinder capacities of the motors 10 and 50, which, if the cylinder capacities of the elementary motors are all equal to C, represents a total cylinder capacity of 4C.

Although the selector 140 shown has only two positions, it can have a third, "highest speed" position, in which it puts the ports 141 and 143 in communication and the ports 142 and 144 in communication, so that the second elementary motors of each of the motors are deactivated. In which case, the total cylinder capacity fed by the pump 30 is equal to the sum of the cylinder capacities of the first elementary motors of the motors 10 and 50, which, if the cylinder capacities are equal to C, represents only 2C.

In FIG. 4, it can be observed that, regardless of the positions of the selectors, the motors 10 and 50 (at least their first elementary motors) are fed in parallel by the pump, while the first elementary motors of the motors 20 and 60 are fed in series by the first elementary motors of the motor 10 and 50. As a result, as a function of the travelling conditions of the vehicle, the flow rate of the fluid delivered by the pump can be shared unequally between the two sides of the vehicle, which improves turning behavior by allowing the wheels on the outside of the turn to use more fluid than the wheels on the inside of the turn.

Figure 5:
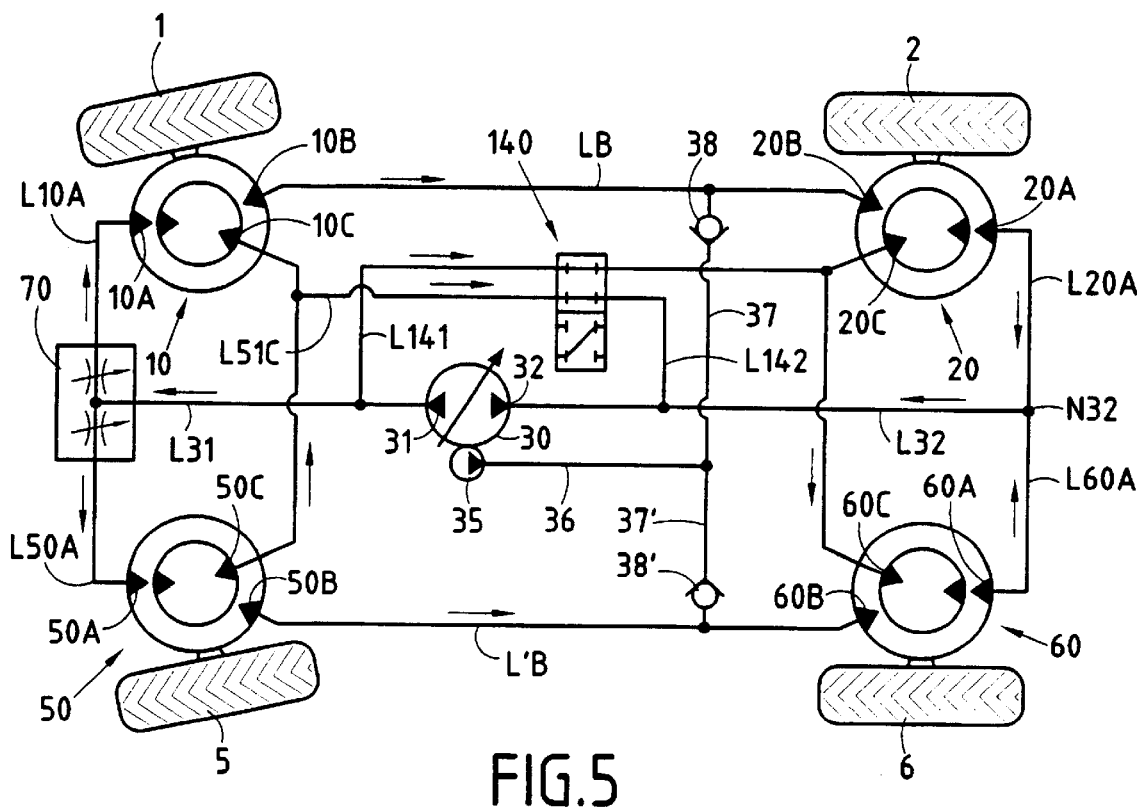
FIG. 5 shows apparatus analogous to the apparatus of FIG. 4, as further equipped with a flow-rate divider.

The apparatus shown in FIG. 5 is analogous to the apparatus shown in FIG. 4, except that it includes a flow-rate divider 70 disposed in the region of the node N31 between the duct L31 and the ducts L10A and L50A. As a result, the flow rate of fluid going through the duct L31 is distributed into predetermined (and generally equal) fractions between motors 10 and 50, i.e. between each of the two sides of the vehicle. This makes it possible to avoid the vehicle losing drive when the displacement members on one side of the vehicle have insufficient adhesion, because the predetermined fraction of the fluid continues to pass through the motor 10 or 50 of the other side of the vehicle. The flow-rate divider may be progressive, so that, during turning, a higher flow rate can be assigned to the motors that drive the displacement members on the outside of the turn. Otherwise, to obtain a flow rate that is higher on the outside of the turn than on the inside of the turn, it is necessary to deactivate the flow-rate divider. This can be done by means of selection apparatus making it possible to deactivate the motors fed in series so as to activate only elementary motors that are fed in parallel, for each side of the vehicle. This selection apparatus may be installed on the selector of the invention which is then provided with an additional position.

Figure 6:
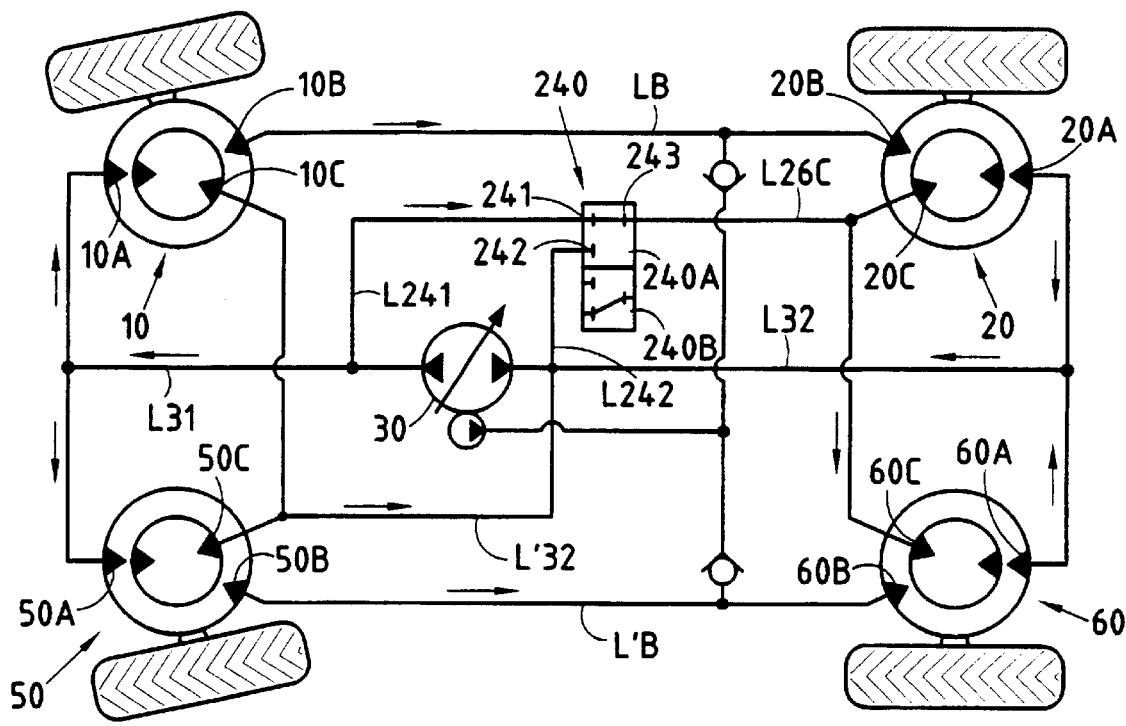
FIG. 6 shows another embodiment of apparatus of the invention as applied to a four-wheel-drive vehicle.

The circuit shown in FIG. 6 is analogous to the circuit shown in FIG. 4, but it includes a selector 240 that differs from the selector 140. The motors 10, 20, 50, and 60 can be seen, with their main connections. Thus, the first main connections 10A and 50A of the motors 10 and 50 are connected to the fluid feed duct L31, while the first main connections 20A and 60A of the motors 20 and 60 are connected to the fluid return duct L32. The selector 240 has only three ports, namely a first port 241 connected to the fluid feed duct L31 via a link duct L241, a second port 242 connected to the fluid return duct L32 via a link duct L242, and a third port 243 connected to the third main connections 20C and 60C of the motors 20 and 60 via a link duct L26C to which said connections are connected in parallel. In contrast, the third main connections 10C and 50C of the motors 10 and 50 are not connected to the selector 240, but rather they are connected directly and continuously to the fluid return duct via a secondary fluid return duct L'32, to which said connections are connected in parallel. Thus, the two elementary motors of each of the motors 10 and 50 are always active independently of the position of the selector 240, by means of the connections 10C and 50C returning directly to the fluid return duct, and by means of the connections 10B and 50B returning to the fluid return duct via the motors 20 and 60.

In its first position 240A (shown in FIG. 6), the selector 240 connects the second elementary connections 20C and 60C of the motors 20 and 60 to the fluid feed duct L31 via the link between the ports 241 and 243, while the port 242 is isolated. The mode of operation is then analogous to that shown in FIG. 4, in which the selector 140 is in its position 140A corresponding to the high-torque position.

In its second position 240B, corresponding to the high-speed position, the selector 240 isolates the port 241, while the connections 20C and 60C of the motors 20 and 60 are connected to the fluid return duct L32 via the link between the ports 242 and 243. In which case, the second elementary motors of the motors 20 and 60 are deactivated, since the connections 20A and 20C, and the connections 60 and 60C are put at the same pressure by being connected to the fluid return duct. In which case, the total cylinder capacity fed by the pump 30 is equal only to the sum of the cylinder capacities 10 and 50, as is the case when the selector 140 is in the position 140B as shown in FIG. 4.

Figure 7:
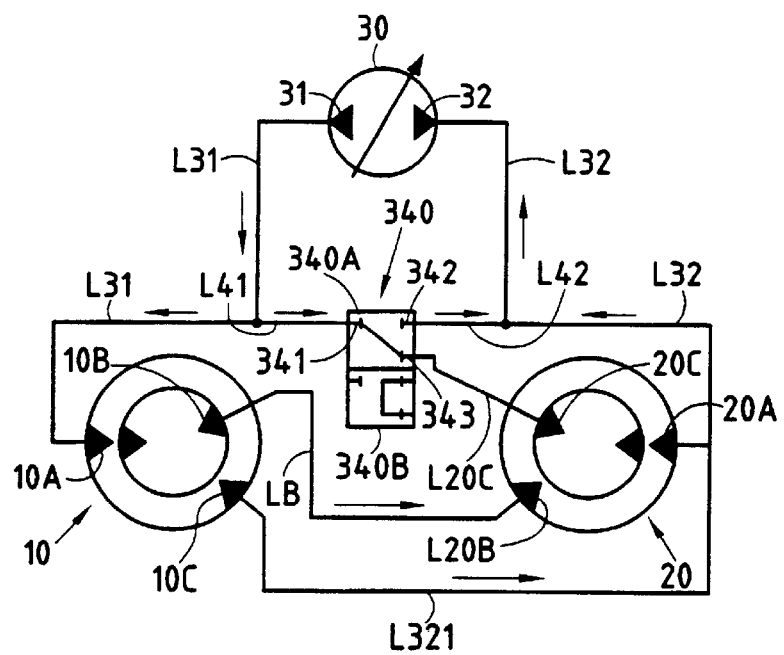
FIG. 7 shows a variant of the apparatus of FIGS. 1 to 3, for another type of selector.

This three-port selector may also be applied to a circuit having only two motors, as shown in FIG. 7. In this Figure, the motors 10 and 20 of FIGS. 1 to 3 can be seen. Their first main connections 10A and 20A are respectively connected to the fluid feed duct L31 and to the fluid return duct L32. Their second main connections 10B and 20B are connected together via the interconnection duct LB. However, the third main connection 10C of the motor 10 is connected to the fluid return duct L32 via an interconnection duct L321. Thus, as shown in FIG. 6, the two elementary motors of the motor 10 are always active regardless of the position of the selector 340, since these connections 10A & 10B, and 10A & 10C are put at different pressures.

The selector 340 has only three ports, respectively a first port 341 connected to the feed duct L31 via a link duct L41, a second port 342 connected to the fluid return duct via a link duct L42, and a third port 343 connected to the third main connection 20C of the motor 20 via a link duct L20C. When the selector 340 is in the first position 340A, the connection 20C is connected to the feed duct L31 via the link between the ports 341 and 343, while the port 342 is isolated. The connection 10C is connected continuously to the link duct L32, the situation being the same as when the FIG. 1 selector 40 is in the position 40A (high-torque position).

In contrast, when the selector 340 is in the second position 340B, the ports 342 and 343 are interconnected so that the main connection 20C is placed at the same pressure as the main connection 20A, thereby deactivating the second elementary motor of the motor 20. In which case, the total cylinder capacity of the apparatus that is fed by the pump is the same as when the FIG. 3 selector 40 is in the position 40C (high-speed position).

What is claimed is:

1. A transmission apparatus for a vehicle, comprising first and second displacement members disposed one behind the other in the direction of displacement of the vehicle, the apparatus further including a hydraulic pump and first and second dual-capacity hydraulic motors to which the first and second displacement members are respectively coupled, each of said hydraulic motors further comprising two elementary motors, each elementary motor having first and second elementary connections for feed or discharge purposes, the first elementary connections being put in common to form a first main connection of the dual-capacity motor, while the second elementary connections are separate and form respectively second and third main connections of the dual-capacity motor, the first main connection of the first hydraulic motor being connected to a fluid feed duct coming from the pump and the first main connection of the second hydraulic motor being connected to a fluid return duct, the second main connections of the first and second hydraulic motors being interconnected via an interconnection duct; said apparatus further including a selector having at least two positions, and connected to said fluid feed duct, to said fluid return duct and to the third main connection of at least one of the first and second hydraulic motors, said selector having a high-torque position in which both hydraulic motors when considered together with respect to their being fed with fluid by the pump present a first total cylinder capacity, and a high-speed position in which both hydraulic motors when considered together with respect to how they are fed with fluid by the pump present a second total cylinder capacity smaller than said first total cylinder capacity.

2. A transmission apparatus according to claim 1, wherein the selector has a high-torque position in which the third main connection of the first motor is connected to the fluid return duct while the third main connection of the second motor is connected to the fluid feed duct, and a high speed position in which the third main connection of the first motor is connected to the fluid feed duct, while the third main connection of the second moor is connected to the fluid return duct.

3. A transmission apparatus according to claim 1, wherein the selector has a high-torque position in which the third main connection of the first motor is connected to the fluid return duct while the third main connection of the second motor is connected to the fluid feed duct and a medium speed position in which the third main connection of the first motor is connected to the third main connection of the second motor.

4. A transmission apparatus according to claim 1, wherein the selector has a high-torque position in which the third main connection of the first motor is connected to the fluid return duct while the third main connection of the second motor is connected to the fluid feed duct, a medium speed position in which the third main connection of the first motor is connected to the third main connection of the second motor and a high speed position in which the third main connection of the first motor is connected to the fluid feed duct, while the third main connection of the second motor is connected to the fluid return duct.

5. A transmission apparatus according to claim 1, wherein the third main connection is connected continuously to the fluid return duct, and wherein the selector has a high-torque position in which the third main connection of the second motor is connected to the fluid feed duct, and a top speed position in which the third main connection of the second motor is connected to the fluid return duct.

6. A transmission apparatus according to claim 1, wherein the two hydraulic motors have cylinder capacities that are substantially equal, and are suitable for driving displacement members having substantially the same development at the same speed.

7. A transmission apparatus according to claim 1, including means for satisfying a bottom pressure limit and a top pressure limit in the interconnection duct between the two main connections of the first and second motors.

8. A transmission apparatus according to claim 1, in which the two motors serve to drive two displacement members to be located on one side of the vehicle, said apparatus further including third and fourth hydraulic motors which are respectively analogous to the first and second motors and which serve to drive two displacement members to be located on the other side of the vehicle, wherein the first main connection of the third motor is connected to the fluid feed duct in parallel with the first main connection of the first motor, the first main connection of the fourth motor is connected to the fluid return duct in parallel with the first main connection of the second motor, the second main connections of the third and fourth motors are interconnected directly, and the third main connections of the third and fourth motors are connected to the selector, respectively, in parallel with the third main connection of the first motor, and in parallel with the third main connection of the second motor.

9. A transmission apparatus according to claim 2, in which the two motors serve to drive two displacement members to be located on one side of the vehicle, said apparatus further including third and fourth hydraulic motors which are respectively analogous to the first and second motors and which serve to drive two displacement members to be located on the other side of the vehicle, wherein the first main connection of the third motor is connected to the fluid feed duct in parallel with the first main connection of the first motor, the first main connection of the fourth motor is connected to the fluid return duct in parallel with the first main connection of the second motor, the second main connections of the third and fourth motors are interconnected directly, and the third main connections of the third and fourth motors are connected to the selector, respectively, in parallel with the third main connection of the first motor, and in parallel with the third main connection of the second motor.

10. A transmission apparatus according to claim 3, in which the two motors serve to drive two displacement members to be located on one side of the vehicle, said apparatus further including third and fourth hydraulic motors which are respectively analogous to the first and second motors and which serve to drive two displacement members to be located on the other side of the vehicle, wherein the first main connection of the third motor is connected to the fluid feed duct in parallel with the first main connection of the first motor, the first main connection of the fourth with the first main connection of the second motor, the second main connections of the third and fourth motors are interconnected directly, and the third main connections of the third and fourth motors are connected to the selector, respectively, in parallel with the third main connection of the first motor, and in parallel with the third main connection of the second motor.

11. A transmission apparatus according to claim 4, in which the two motors serve to drive two displacement members to be located on one side of the vehicle, said apparatus further including third and fourth hydraulic motors which are respectively analogous to the first and second motors and which serve to drive two displacement members to be located on the other side of the vehicle, wherein the first main connection of the third motor is connected to the fluid feed duct in parallel with the first main connection of the first motor, the first main connection of the fourth motor is connected to the fluid return duct in parallel with the first main connection of the second motor, the second main connections of the third and fourth motors are interconnected directly, and the third main connections of the third and fourth motors are connected to the selector, respectively, in parallel with the third main connection of the first motor, and in parallel with the third main connection of the second motor.

12. A transmission apparatus according to claim 5, in which the two motors serve to drive two displacement members to be located on one side of the vehicle, said apparatus further including third and fourth hydraulic motors which are respectively analogous to the first and second motors and which serve to drive two displacement members to be located on the other side of the vehicle, wherein the first main connection of the third motor is connected to the fluid feed duct in parallel with the first main connection of the first motor, the first main connection of the fourth motor is connected to the fluid return duct in parallel with the first main connection of the second motor, the second main connections of the third and fourth motors are interconnected directly, and the third main connections of the third and fourth motors are connected to the selector, respectively, in parallel with the third main connection of the first motor, and in parallel with the third main connection of the second motor.

13. A transmission apparatus according to claim 8, including a flow-rate divider disposed on the main feed duct between the first connection of the first motor and the first connection of the third motor and serving to distribute the flow rate of the fluid flowing through the main feed duct between said connections.

14. A transmission apparatus according to claim 9, including a flow rate divider disposed on the main feed duct between the first connection of the first motor and the first connection of the third motor and serving to distribute the flow rate of the fluid flowing through the main feed duct between said connections.

15. A transmission apparatus according to claim 10, including flow rate divider disposed on the main feed duct between the first connection of the first motor and the first connection of the third motor and serving to distribute the flow rate of the fluid flowing through the main feed duct between said connections.

16. A transmission apparatus according to claim 11, including a flow-rate divider disposed on the main feed duct between the first connection of the first motor and the first connection of the third motor and serving to distribute the flow rate of the fluid flowing through the main feed duct between said connections.

17. A transmission apparatus according to claim 12, including a flow rate divider disposed on the main feed duct between the first connection of the first motor and the first connection of the third motor and serving to distribute the flow rate of the fluid flowing through the main feed duct between said connections.

18. A transmission apparatus according to claim 1, wherein the hydraulic pump is a pump having a variable flow rate and two ports, and wherein the fluid feed duct and the fluid return duct are connected to respective ones of the two ports of the pump, the apparatus thus having a closed-circuit configuration.

19. A transmission apparatus according to claim 1, wherein, regardless of the selector's position, the second main connections of said first and second motors are connected one with the other and are isolated from the first main connections and from the third main connections of the motors.

20. A transmission apparatus according to claim 8 wherein, regardless of the selector's position, the second main connections of said first and second motors are connected one with the other and are isolated from the first main connections and from the third main connections of the first and second motors, and the second main connections of said third and fourth motors are connected one with the other and are isolated from the first main connections and from the third main connections of the third and fourth motors.

21. A transmission apparatus according to claim 9 wherein, regardless of the selector's position, the second main connections of said first and second motors are connected one with the other and are isolated from the first main connections and from the third main connections of the first and second motors, and the second main connections of said third and fourth motors are connected one with the other and are isolated from the first main connections and from the third main connections of the third and fourth motors.

22. A transmission apparatus according to claim 10 wherein, regardless of the selector's position, the second main connections of said first and second motors are connected one with the other and are isolated from the first main connections and from the third main connections of the first and second motors, and the second main connections of said third and fourth motors are connected one with the other and are isolated from the first main connections and from the third main connections of the third and fourth motors.

23. A transmission apparatus according to in claim 11 wherein, regardless of the selector's position, the second main connections of said first and second motors are connected one with the other and are isolated from the first main connections and from the third main connections of the first and second motors, and the second main connections of said third and fourth motors are connected one with the other and are isolated from the first main connections and from the third main connections of the third and fourth motors.

24. A transmission apparatus according to claim 12 wherein, regardless of the selector's position, the second main connections of said first and second motors are connected one with the other and are isolated from the first main connections and from the third main connections of the first and second motors, and the second main connections of said third and fourth motors are connected one with the other and are isolated from the first main connections and from the third main connections of the third and fourth motors.

* * * * *